(12) United States Patent
Ando et al.

(10) Patent No.: US 8,880,342 B2
(45) Date of Patent: Nov. 4, 2014

(54) MOVING BODY POSITION DETECTION SYSTEM, MOVING BODY POSITION DETECTION APPARATUS, MOVING BODY POSITION DETECTION METHOD, AND COMPUTER-READABLE STORAGE MEDIUM

(71) Applicants: Yohei Ando, Anjo (JP); Takuma Yagi, Sapporo (JP)

(72) Inventors: Yohei Ando, Anjo (JP); Takuma Yagi, Sapporo (JP)

(73) Assignee: Aisin AW Co., Ltd., Anjo-shi (JP)

( * ) Notice: Subject to any disclaimer, the term of this patent is extended or adjusted under 35 U.S.C. 154(b) by 0 days.

(21) Appl. No.: 13/738,590

(22) Filed: Jan. 10, 2013

(65) Prior Publication Data

US 2013/0245936 A1 Sep. 19, 2013

(30) Foreign Application Priority Data

Mar. 13, 2012 (JP) ................................ 2012-055930

(51) Int. Cl.
*G01C 21/12* (2006.01)

(52) U.S. Cl.
CPC ...................................... *G01C 21/12* (2013.01)
USPC ........... 701/501; 701/494; 701/495; 701/469; 701/472

(58) Field of Classification Search
CPC ......... G01C 21/12; G01C 21/30; G01C 21/20
USPC .......................... 701/501, 494, 495, 469, 472
See application file for complete search history.

(56) References Cited

U.S. PATENT DOCUMENTS

| 6,766,247 B2 | 7/2004 | Mosis |
| 7,286,933 B2* | 10/2007 | Cho, II .......................... 701/472 |
| 2004/0044477 A1* | 3/2004 | Jung et al. ......................... 702/5 |
| 2011/0125402 A1* | 5/2011 | Mitsugi et al. ................ 701/208 |

FOREIGN PATENT DOCUMENTS

| JP | 8-334354 A | 12/1996 |
| JP | 2007-139503 A | 6/2007 |
| JP | 2008-139153 A | 6/2008 |
| JP | 4651511 B2 | 3/2011 |
| WO | 01/84081 A1 | 11/2001 |

OTHER PUBLICATIONS

Extended European Search Report, dated Sep. 2, 2014, issued in counterpart European Patent Application No. 13155001.4.

* cited by examiner

*Primary Examiner* — Mary Cheung
*Assistant Examiner* — Brian P Sweeney
(74) *Attorney, Agent, or Firm* — Sughrue Mion, PLLC

(57) ABSTRACT

A moving body position detection system including an unit acquiring dead reckoning navigation information including a moving body direction; a unit identifying a moving body position based on the dead reckoning navigation information on the moving body; a unit predicting a predicted arrived position of the moving body after a predetermined interval from the position of the moving body based on the dead reckoning navigation information on the moving body; a unit calculating a difference direction angle between a direction from the position of the moving body to the predicted position and the direction of the moving body; a unit correcting the difference direction angle if it is equal to or larger than a threshold; and a unit updating the moving body position based on the difference direction angle.

10 Claims, 6 Drawing Sheets

MOVING BODY POSITION DETECTION SYSTEM, MOVING BODY POSITION DETECTION APPARATUS, MOVING BODY POSITION DETECTION METHOD, AND COMPUTER-READABLE STORAGE MEDIUM

INCORPORATION BY REFERENCE

The disclosure of Japanese Patent Application No. 2012-055930 filed on Mar. 13, 2012 including the specification, drawings and abstract is incorporated herein by reference in its entirety.

BACKGROUND OF THE INVENTION

1. Field of the Invention

The invention relates to a moving body position detection system, a moving body position detection apparatus, a moving body position detection method, and a computer-readable storage medium for detecting the position of a moving body.

2. Description of the Related Art

Recently, a navigation device that provides a vehicle with traveling guidance is mounted in many cases in the vehicle to allow a driver to easily arrive at a desired destination. A navigation device uses a GPS receiver to detect the current position of a host vehicle, acquires map data, corresponding to the current position, from a recording medium such as a DVD-ROM or an HDD or from a network, and displays the acquired data on a liquid crystal monitor. In addition, the navigation device has the route search function that searches for an optimal route from the starting point to the destination in response to a destination input by the driver. The navigation device displays a guidance route, which is selected based on the search result, on the display screen. In addition, when the vehicle approaches a junction where guidance on right turn or left turn is necessary (hereinafter called a guidance junction), the navigation device gives a guidance via voice or a display screen to guide the user to a desired destination. Recently, some of the mobile phones, smartphones, Personal Digital Assistants (PDA), and personal computers have a function similar to that of the navigation device described above. In addition, the guidance described above may be given not only to a vehicle but also to a pedestrian or a bicycle.

When a vehicle approaches a guidance junction where guidance such as a right or left turn instruction is given, it is important to give such guidance with right timing. Giving guidance with right timing requires the accurate detection of the vehicle's current position. The accurate detection of the current position of a vehicle is important not only for giving guidance on a guidance junction but also for controlling the vehicle (for example, decelerating the vehicle) when the vehicle approaches a junction.

One of the conventionally known methods for detecting the vehicle's current position is a dead reckoning navigation that relatively detects the vehicle's current position using the information (dead reckoning navigation information) obtained from a distance sensor or an angle sensor mounted in the vehicle. However, the method for relatively identifying the vehicle's position from the dead reckoning navigation information used in a dead reckoning navigation cannot accurately detect the vehicle's current position when the vehicle travels on a road with a special shape such as a curved road or a rotary. To solve this problem, Japanese Patent No. 4651511 proposes a technology for accurately detecting the vehicle's current position by detecting the turning angular amount relative to the base point of the rotary when the vehicle passes through a rotary.

SUMMARY OF INVENTION

The technology described in Japanese Patent No. 4651511 still has the problem that the vehicle's current position cannot be accurately detected in the cases described below.

The dead reckoning navigation identifies the detected current position of a vehicle on a road so that the detected vehicle position does not deviate from the road. That is, the vehicle's current position is detected on the assumption that a vehicle moves along a link included in the map information. However, because a traveling path along which a vehicle actually travels does not necessarily match the shape of a link included in the map information, the actual vehicle's position sometimes does not match the detected position.

For example, when a vehicle 102 travels through a rotary 101 as shown in FIG. 7, links 103 of the rotary 101 do not exactly match a traveling path 104 of the vehicle 102. In particular, when the vehicle 102 enters or exits the rotary 101, the traveling path 104 is a path that turns at a predetermined angle and, therefore, the traveling path in that part becomes shorter than the corresponding link 103. The dead reckoning navigation described above detects the vehicle position on the assumption that the vehicle 102 travels along a link. This means that, when the vehicle 102 exits the rotary 101, the position X of the vehicle 102 detected by the dead reckoning navigation is behind the actual position Y. That is, there is a difference between the actual position of the vehicle 102 and the detected position.

The present invention provides a moving body position detection system, a moving body position detection apparatus, a moving body position detection method, and a computer-readable storage medium that can accurately detect the position of a moving body when the position of the moving body is detected based on the dead reckoning navigation information.

A first aspect of the invention is a moving body position detection system including: a dead reckoning navigation information acquisition unit that acquires dead reckoning navigation information including a direction of a moving body; a position identification unit that identifies a position of the moving body based on the dead reckoning navigation information on the moving body; a position prediction unit that predicts a predicted position at which the moving body is to arrive after an elapse of a predetermined interval from the position of the moving body, identified by the position identification unit, based on the dead reckoning navigation information on the moving body; a direction angle calculation unit that calculates a difference direction angle that is a difference between a direction from the position of the moving body, identified by the position identification unit, to the predicted position and the direction of the moving body; a direction angle correction unit that corrects the difference direction angle if the difference direction angle is equal to or larger than a threshold; and a position update unit that updates the position of the moving body, identified by the position identification unit, based on the difference direction angle.

A second aspect of the invention is a moving body position detection apparatus including: a dead reckoning navigation information acquisition unit that acquires dead reckoning navigation information including a direction of a moving body; a position identification unit that identifies a position of the moving body based on the dead reckoning navigation information on the moving body; a position prediction unit that predicts a predicted position at which the moving body is to arrive after an elapse of a predetermined interval from the position of the moving body, identified by the position identification unit, based on the dead reckoning navigation information on the moving body; a direction angle calculation unit that calculates a difference direction angle that is a difference between a direction from the position of the moving body, identified by the position identification unit, to the predicted position and the direction of the moving body; a direction angle correction unit that corrects the difference direction angle if the difference direction angle is equal to or larger than a threshold; and a position update unit that updates the position of the moving body, identified by the position identification unit, based on the difference direction angle.

A third aspect of the invention is a moving body position detection method including: acquiring dead reckoning navigation information including a direction of a moving body; identifying a position of the moving body based on the dead reckoning navigation information on the moving body; predicting a predicted position at which the moving body is to arrive after an elapse of a predetermined interval from the identified position of the moving body, based on the dead reckoning navigation information on the moving body; calculating a difference direction angle that is a difference between a direction from the identified position of the moving body to the predicted position and the direction of the moving body; correcting the difference direction angle if the difference direction angle is equal to or larger than a threshold; and updating the identified position of the moving body based on the difference direction angle.

A fourth aspect of the invention is a non-transitory computer-readable storage medium that stores computer-executable instructions for performing a moving body position detection function including: acquiring dead reckoning navigation information including a direction of a moving body; identifying a position of the moving body based on the dead reckoning navigation information on the moving body; predicting a predicted position at which the moving body is to arrive after an elapse of a predetermined interval from the identified position of the moving body, based on the dead reckoning navigation information on the moving body; calculating a difference direction angle that is a difference between a direction from the identified position of the moving body to the predicted position and the direction of the moving body; correcting the difference direction angle if the difference direction angle is equal to or larger than a threshold; and updating the identified position of the moving body based on the difference direction angle.

According to the configurations described above, if the difference direction angle, which is a difference between the direction of a moving body acquired based on the dead reckoning navigation information and the displacement direction of the moving body position, is equal to or larger than a threshold, the difference direction angle is corrected and, based on the corrected difference direction angle, the detection position of the moving body is updated. Therefore, when the position of a moving body is detected based on the dead reckoning navigation information, the position of the moving body can be detected accurately.

BRIEF DESCRIPTION OF DRAWINGS

The features, advantages, and technical and industrial significance of this invention will be described below with reference to the accompanying drawings, in which like numerals denote like elements, and wherein.

DETAILED DESCRIPTION OF EMBODIMENTS

Figure 1:
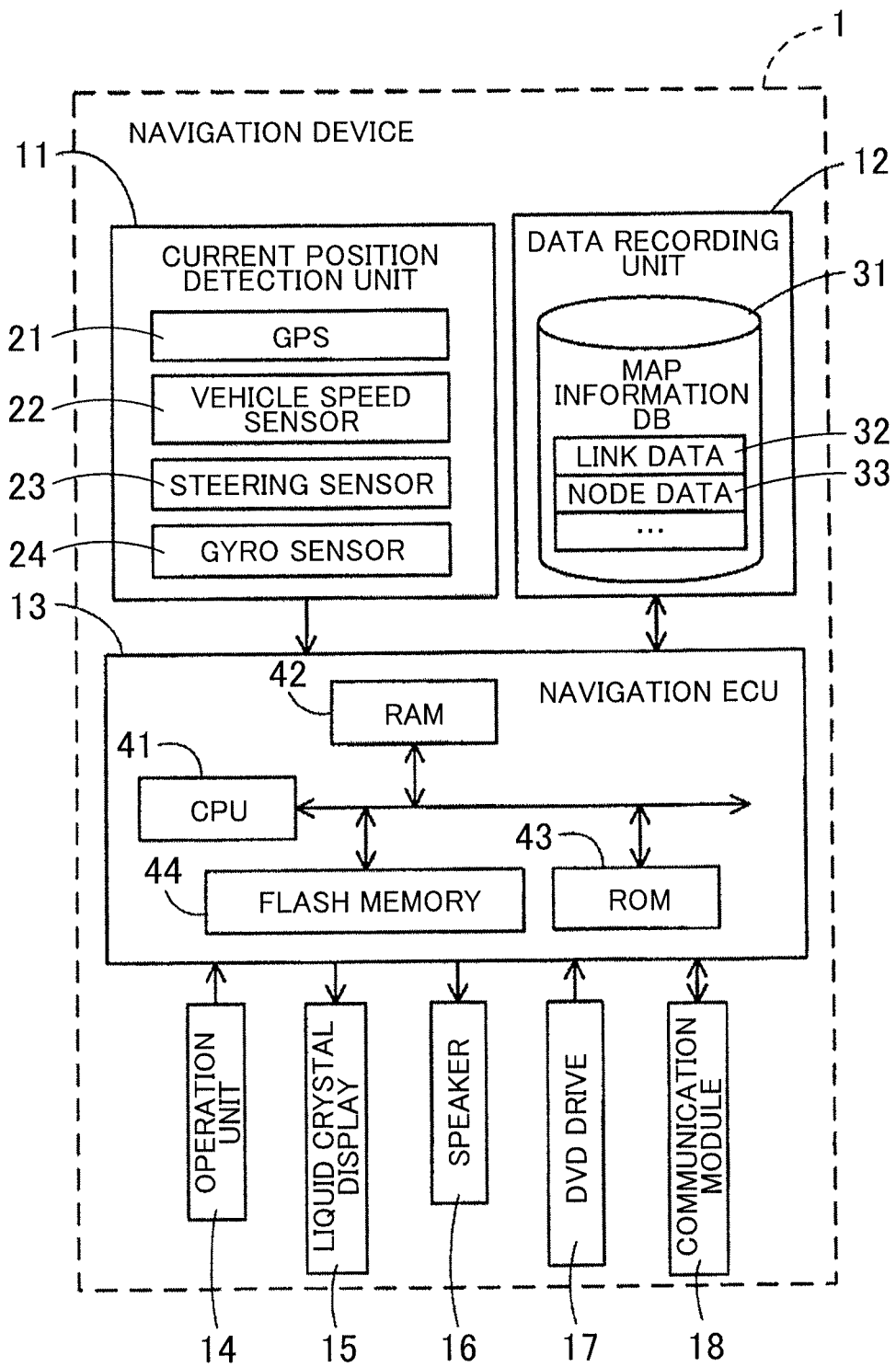
FIG. 1 is a block diagram showing a navigation device in an embodiment.

A moving body position detection system and a moving body position detection apparatus according to the present invention will be described in detail below with reference to the drawings based on one embodiment in which the moving body position detection system and the moving body position detection apparatus are embodied as a navigation device. First, the following describes the general configuration of a navigation device 1 in this embodiment with reference to FIG. 1. FIG. 1 is a block diagram showing a navigation device 1 in this embodiment.

As shown in FIG. 1, the navigation device 1 in this embodiment includes the following: a current position detection unit 11 that detects the current position of a vehicle in which the navigation device 1 is mounted, a data recording unit 12 in which various types of data is recorded, a navigation electronic control unit (ECU) 13 that performs various types of operation processing based on received information, an operation unit 14 that accepts an operation from the user, a liquid crystal display 15 that displays to the user a map around a vehicle and facility information about the facilities, a speaker 16 that outputs voice guidance about route guidance, a DVD drive 17 that reads a DVD that is a recording medium, and a communication module 18 that communicates with an information center such as a probe center or the Vehicle Information and Communication System (VICS: registered trademark) center.

The following describes the components of the navigation device 1, one by one. The current position detection unit 11, which includes a GPS 21, a vehicle speed sensor 22, a steering sensor 23, and a gyro sensor 24, is configured to detect the current position, current direction, and traveling speed of the vehicle and the current time of day. The vehicle speed sensor 22, a sensor to detect the traveling distance or vehicle speed, generates a pulse according to the rotation of vehicle's driving wheel and outputs the generated pulse signal to the navigation ECU 13. The navigation ECU 13 counts the generated pulses to calculate the rotation speed of the driving wheel and the traveling distance. The navigation ECU 13 cooperates with the vehicle speed sensor 22, gyro sensor 24, and GPS 21 to accurately generate a dead reckoning navigation path (that is, detects the vehicle's current position) generated based on the dead reckoning navigation information. the dead reckoning navigation, which is the output signal of the vehicle speed sensor 22 or gyro sensor 24, indicates the traveling distance information or the direction information on the vehicle. Note that the navigation device 1 need not have all of the four types of sensors described above but may have only one or more of them.

The data recording unit 12 includes two components: a hard disk and a recording head (both not shown). The hard disk serves as an external storage device and a recording medium. The recording head reads a map information DB 31 and a predetermined program from the hard disk and, at the same time, writes predetermined data on the hard disk. The data recording unit 12 may be configured not by a hard disk but by a memory card or by an optical disc such as a CD or a DVD.

The map information DB 31 is a storage unit that stores link data 32 on the roads (links), node data 33 on the nodes, junction data on the junctions, facility data on the facilities, map display data for displaying a map, search data for searching for a route, and find data for finding a location.

The link data 32 includes a link ID that identifies a link, end node information that identifies a node located at the end of a link, a road type (link type) of a road configuring a link, a road attribute (link attribute) of a road configuring a link, a link direction, and position coordinates of a shape interpolation point for identifying the shape of a link between nodes (for example, curve shape of a curved road). The link type includes information that identifies the type of a road such as an open road, a toll road, and an expressway. The link attribute includes the information that identifies whether a road forms a rotary (roundabout), the number of lanes, and the information that identifies whether the road is a one-way road or a two-way road. The node data 33 includes a node ID that identifies a node, the position coordinates of a node, and connection destination node information that identifies a connection destination node to which a node is connected via a link.

On the other hand, the navigation ECU 13 is an electronic control unit that controls the navigation device 1 in its entirety. The navigation ECU 13 includes a CPU 41, which works as both an operation device and a control device, and internal storage devices such as a RAM 42, a ROM 43, and a flash memory 44. The RAM 42 is used as a working memory when the CPU 41 performs various types of operation processing and, in addition, stores route data when a route is searched for. The ROM 43 stores the control program and the vehicle position detection processing program (see FIGS. 2A and 2B) described later. The flash memory 44 stores a program read from the ROM 43. The navigation ECU 13 configures various units each of which functions as the processing algorithm. For example, the dead reckoning navigation information acquisition unit is configured to acquire dead reckoning navigation information including the direction of a vehicle (moving body). The position identification unit is configured to identify the position of a vehicle based on the dead reckoning navigation information on the vehicle. The position prediction unit is configured to predict a predicted position at which a vehicle is to arrive after an elapse of a predetermined time from the vehicle's position, identified by the position identification unit, based on the dead reckoning navigation information on the vehicle. The direction angle calculation unit is configured to calculate a difference direction angle that is the difference in angle between the direction from the vehicle's position, identified by the position identification unit, to the predicted position and the direction of the vehicle. The direction angle correction unit is configured to correct the difference direction angle if the difference direction angle is equal to or larger than the threshold. The position update unit is configured to update the vehicle's position, identified by the position identification unit, based on the difference direction angle. The first correction position identification unit is configured to identify a first correction position obtained by moving the vehicle's position, identified by the position identification unit, in the backward direction of the vehicle's traveling direction. The second correction position identification unit is configured to identify a second correction position obtained by moving the predicted position in the forward direction of the vehicle's traveling direction. The cost calculation unit is configured to calculate the cost for each of the multiple predicted positions based on the difference direction angle.

The operation unit 14, which is operated by the user to enter a starting point as the travel start point and a destination as the travel termination point, includes multiple operation switches (not shown) such as various keys and buttons. The navigation ECU 13 performs the control operation in response to a switch signal, which is output by pressing an operation switch, to execute various operations corresponding to the switch signal. The operation unit 14 may be configured by a touch panel provided on the front of the liquid crystal display 15. The operation unit 14 may also be configured by a microphone and a voice recognition device.

The liquid crystal display 15 displays a map image including the roads, traffic information, operation guide, operation menu, key guide, recommended route from the start point to the destination, guidance information on a road along a recommended route, news, weather forecast, time of day, mail, and TV programs. When a map image is displayed, the liquid crystal display 15 displays the current position mark indicating the vehicle's current position identified by the vehicle position detection processing program (see FIGS. 2A and 2B) described later.

The speaker 16 outputs voice guidance that guides the driver along a recommended route or outputs traffic guidance information in response to an instruction from the navigation ECU 13.

The DVD drive 17 is a drive capable of reading data from a recording medium such as a DVD or a CD. Based on the data that is read, the DVD drive 17 plays music or video or updates the map information DB 31.

The communication module 18 is a communication device that receives traffic information sent from a traffic information center such as the VICS center or the probe center. For example, a mobile phone or a DCM is used as the communication device. The traffic information includes traffic jam information, traffic regulation information, and traffic accident information.

Figure 2A:
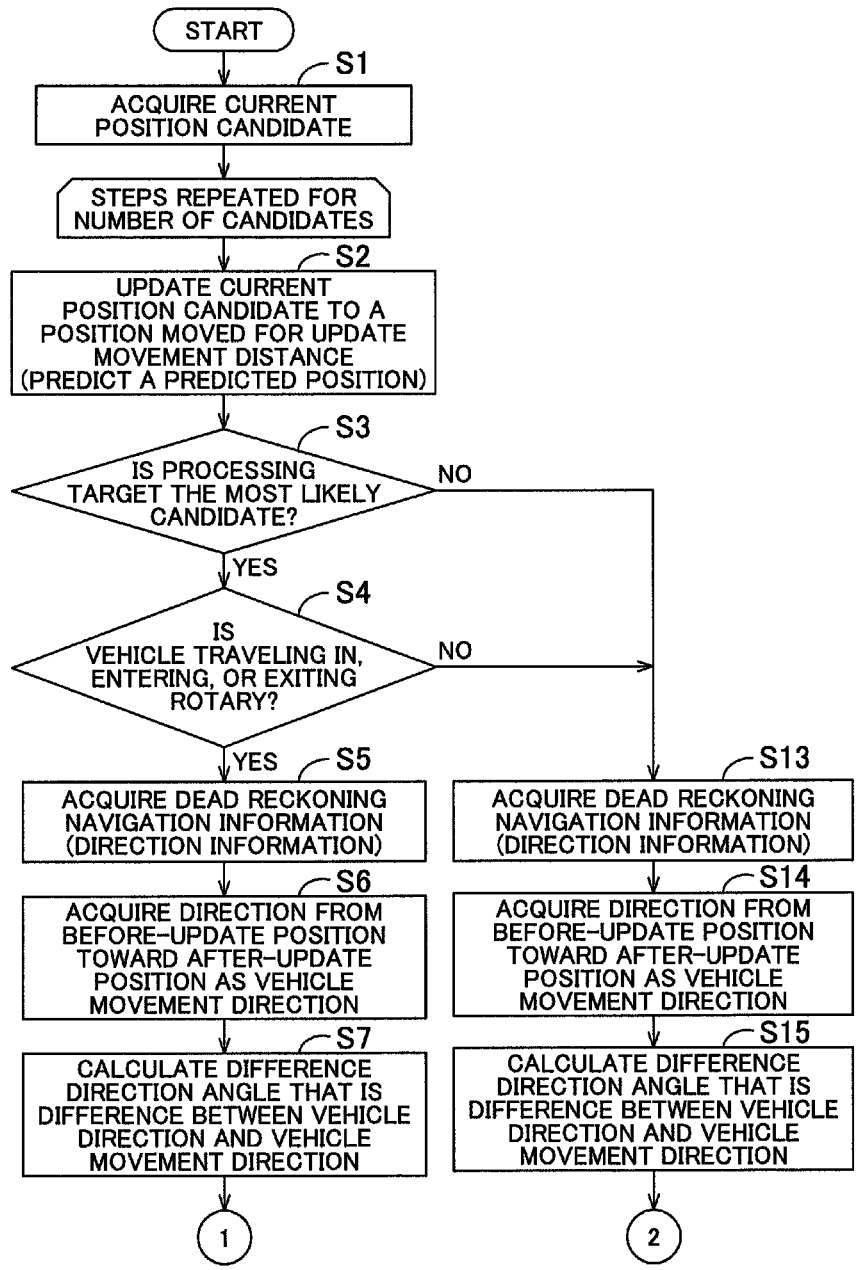
FIGS. 2A and 2B are flowcharts showing a vehicle position detection processing program in the embodiment.
Figure 2B:
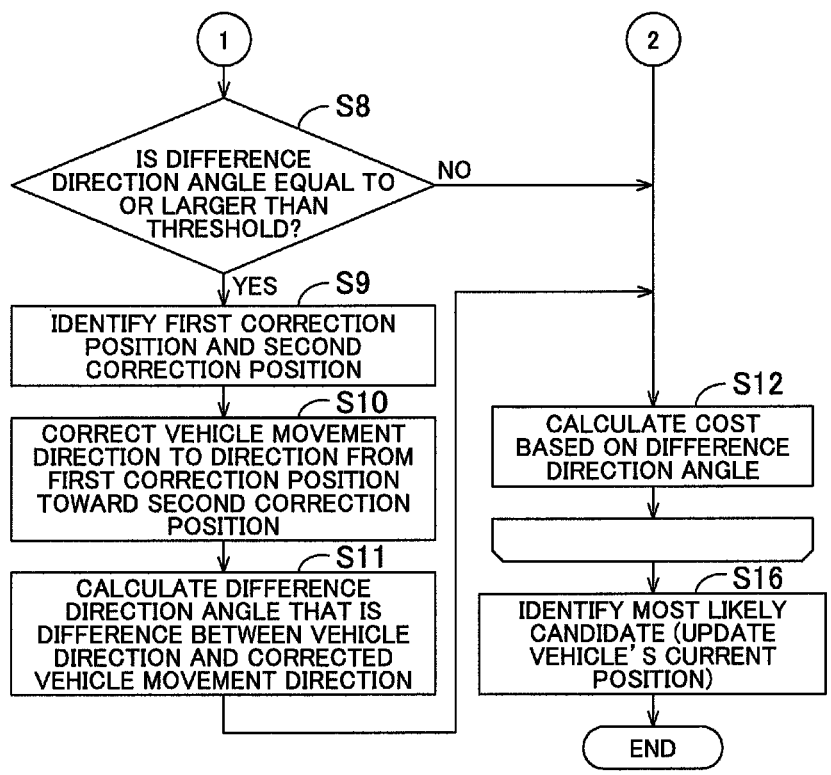

Next, with reference to FIGS. 2A and 2B, the following describes the vehicle position detection processing program executed by the navigation ECU 13 in the navigation device 1 that is configured as described above. FIGS. 2A and 2B are flowcharts showing the processing of the vehicle position detection processing program in this embodiment. The vehicle position detection processing program, a program that detects the vehicle's current position based on the dead reckoning navigation, is executed repeatedly at a predetermined interval (at a periodic interval at which the vehicle's current position is detected, i.e., each time the vehicle travels a predetermined detection interval distance (for example, 6 m)) after the ACC of the vehicle is turned on. The program shown in the flowchart in FIGS. 2A and 2B below is stored in the RAM 42 or ROM 43, included in the navigation device 1, for execution by the CPU 41.

The vehicle position detection processing program operates as follows. First, in step 1 (hereinafter, step is abbreviated S), the CPU 41 acquires a current position candidate that is a candidate for the vehicle's current position. The current position candidate is composed of one or more candidates. When the current position candidate is composed of multiple candidates, the candidate, which is one of the multiple candidates and is considered the most likely current position candidate based on the cost calculation described later, is identified as the most likely candidate. In contrast, when the current position candidate is composed of only one candidate, the only one candidate is identified as the most likely candidate. After that, on the assumption that the vehicle is located at the position corresponding to the most likely candidate, other processing (vehicle's current position display control, junction guidance control, vehicle speed reduction control, and so on) that uses the vehicle's current position is executed. That is, it is detected that the vehicle is located at the position corresponding to the most likely candidate.

The subsequent processing, S2 to S15, is executed for each current position candidate acquired in S1. After processing S2-S15 is performed for all current position candidates, the processing proceeds to S16.

In S2, the CPU 41 updates the position of a processing-target current candidate. More specifically, the CPU 41 updates the position of the current position candidate to a position obtained by moving the processing-target current position candidate an update movement distance into the forward direction of the vehicle's traveling direction along the link. That is, the CPU 41 predicts the predicted position at which the vehicle is to be located after a predetermined interval. Basically, the update movement distance is the detection interval distance (for example, 6 m) of the current position. Note that the detection interval distance of the current position is equal to the traveling distance interval of the vehicle and that the vehicle position detection processing program is executed for each traveling distance interval.

Next, in step S3, the CPU 41 determines whether the processing-target current position candidate is the most likely candidate.

If the processing-target current position candidate is the most likely candidate (S3: YES), the processing proceeds to S4. Conversely, if the processing-target current position candidate is not the most likely candidate (S3: NO), the processing proceeds to S13.

Figure 3:
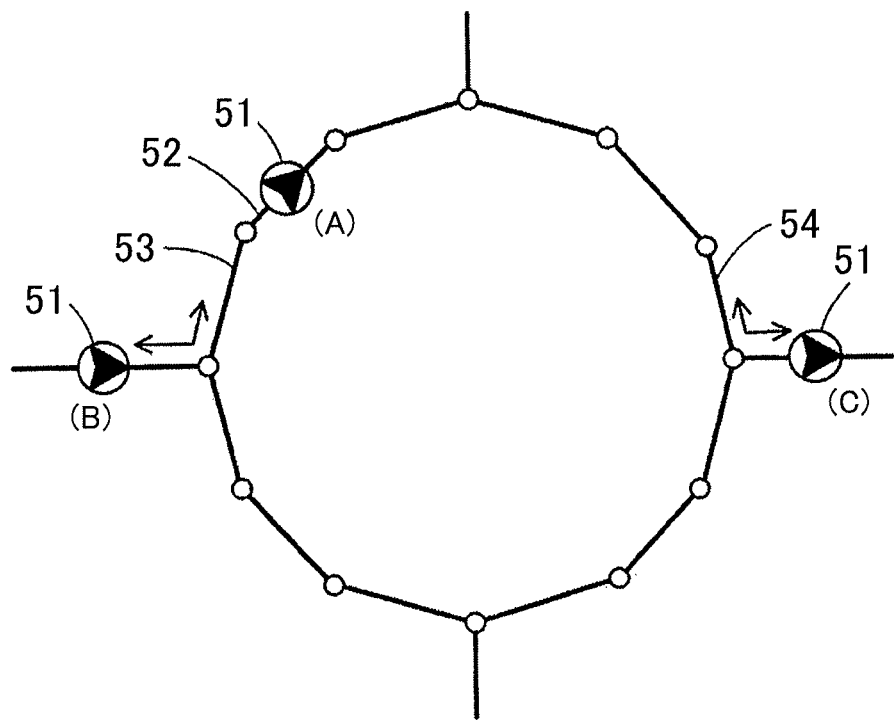
FIG. 3 is a diagram showing the state in which a vehicle is traveling in a rotary, the state in which a vehicle is going to enter the rotary, and the state in which a vehicle is exiting the rotary.

Next, in step S4, the CPU 41 determines whether the vehicle is in one of the following states, (A) to (C).
(A) State in which the vehicle is moving in a rotary
(B) State in which the vehicle is entering a rotary
(C) State in which the vehicle is exiting a rotary More specifically, the CPU 41 performs the following processing to determine whether the vehicle is in one of the states, (A) to (C). First, the CPU 41 identifies a link in which the processing-target current position candidate is located (hereinafter, this link called a current position link). Next, the CPU 41 acquires the link attribute of the current position link from the link data 32 stored in the data recording unit 12. When a current position link 52, in which a processing-target current position candidate 51 is located, is a link configuring a rotary as shown in FIG. 3, it is determined that the vehicle is in "(A) state in which the vehicle is moving in a rotary". When the current position link 52 is not a link configuring the rotary but when there is a link 53, which configures the rotary, within a predetermined distance (for example, within 12 m) from the processing-target current position candidate 51 in the forward direction of the traveling direction as shown in FIG. 3, it is determined that the vehicle is in "(B) State in which the vehicle is entering a rotary". When the current position link 52 is not a link configuring the rotary but when there is a link 54, which configures the rotary, within a predetermined distance (for example, within 18 m) from the processing-target current position candidate 51 in the backward direction of the traveling direction as shown in FIG. 3, it is determined that the vehicle is in "(C) State in which the vehicle is exiting a rotary."

If the vehicle is in one of the states, (A)-(C), described above (S4: YES), the processing proceeds to S5. In contrast, if the vehicle is not in any of the states (A)-(C) (S4: NO), the processing proceeds to S13.

In S5, the CPU 41 acquires the detection signal of the gyro sensor 24 (that is, direction information on the current vehicle) as the dead reckoning navigation information.

Next, in S6, the CPU 41 determines the direction from the position of the processing-target current position candidate before the update in S2 (hereinafter called before-update position) toward the position of the processing-target current position candidate after the update in S2 (hereinafter called after-update position) and acquires the determined direction as the vehicle movement direction.

Next, in S7, the CPU 41 calculates the difference direction angle that is the difference between the current vehicle direction, acquired in S5, and the vehicle movement direction acquired in S6.

Figure 4:
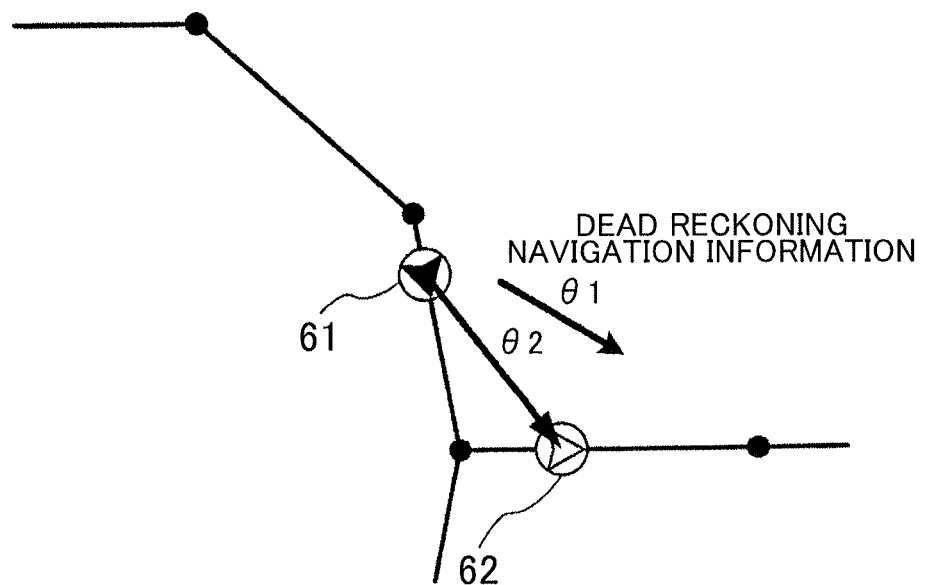
FIG. 4 is a diagram showing the corrected target position setting method.

The following describes in detail the processing of calculating the difference direction angle in S7 with reference to FIG. 4. As shown in FIG. 4, the CPU 41 updates the processing-target current position candidate in S2 to an after-update position 62 obtained by moving a before-update position 61 a detection interval distance (for example, 6 m) into the forward direction of the vehicle's traveling direction. After that, the CPU 41 compares the vehicle direction θ1, acquired as the dead reckoning navigation information, and the vehicle movement direction θ2 that is the direction from the before-update position 61 toward the after-update position 62 and calculates the absolute value of the difference between the vehicle direction θ1 and the vehicle movement direction θ2 (|θ1−θ2|) as the difference direction angle.

After that, the CPU 41 determines in S8 whether the difference direction angle, calculated in S7, is equal to or larger than a threshold (for example, 20 degrees). The threshold, any user-specified value, is stored in a storage unit such as the RAM 42. The threshold may also be changed according to the type or the width of the road on which the vehicle travels.

If the difference direction angle is equal to or larger than the threshold (S8: YES), the processing proceeds to S9. Conversely, if the difference direction angle is smaller than the threshold (S8: NO), the processing proceeds to S12 and, as will be described later, the CPU 41 performs the cost calculation of the processing-target current position candidate based on the calculated difference direction angle.

Figure 5:
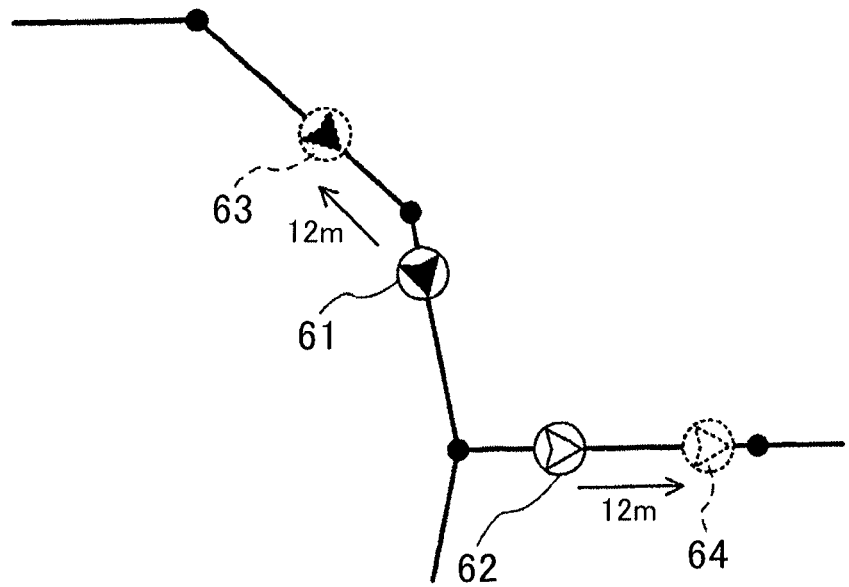
FIG. 5 is a diagram showing the update processing of a current position candidate performed based on a corrected target position.

In S9, the CPU 41 identifies a first correction position that is the position obtained by moving the before-update position a predetermined distance (for example, 12 m) into the backward direction of the vehicle's traveling direction. In S9, the CPU 41 also determines a second correction position that is the position obtained by moving the after-update position (predicted position) a predetermined distance (for example, 12 m) into the forward direction of the vehicle's traveling direction. For example, when there are the before-update position 61 and the after-update position 62 as shown in FIG. 5, a first correction position 63, obtained by moving the before-update position 61 into the backward direction of the vehicle's traveling direction for 12 m, and a second correction position 64, obtained by moving the after-update position 62 into the forward direction of the vehicle's traveling direction for 12 m, are identified.

Next, in S10, the CPU 41 corrects the vehicle movement direction, acquired in S6, to the direction from the second connection position toward the first connection position.

Next, in S11, the CPU 41 calculates the difference direction angle again that is the difference between the current vehicle direction, acquired in S5, and the vehicle movement direction connected in S10.

Figure 6:
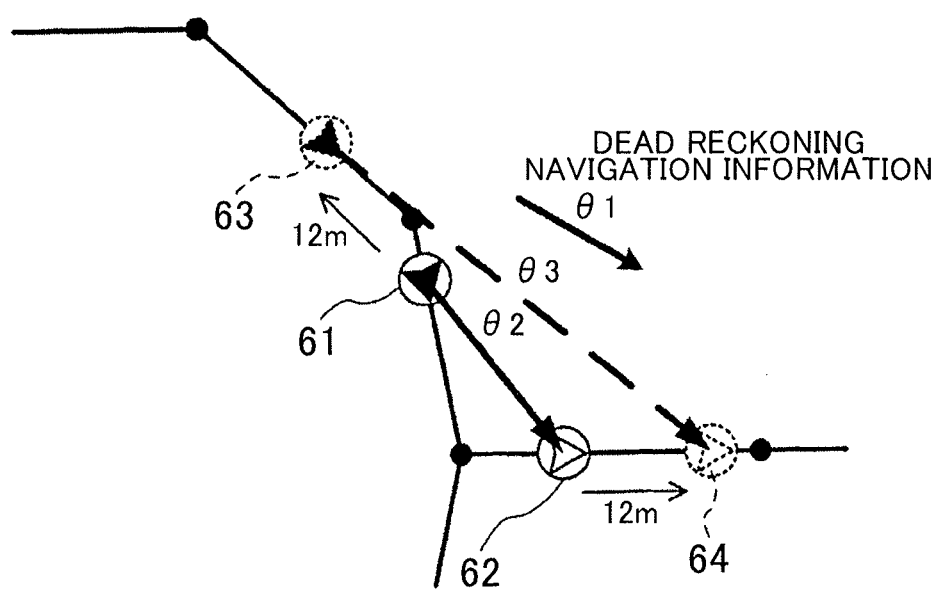
FIG. 6 is a diagram showing the update processing of a current position candidate performed based on a corrected target position.
Figure 7:
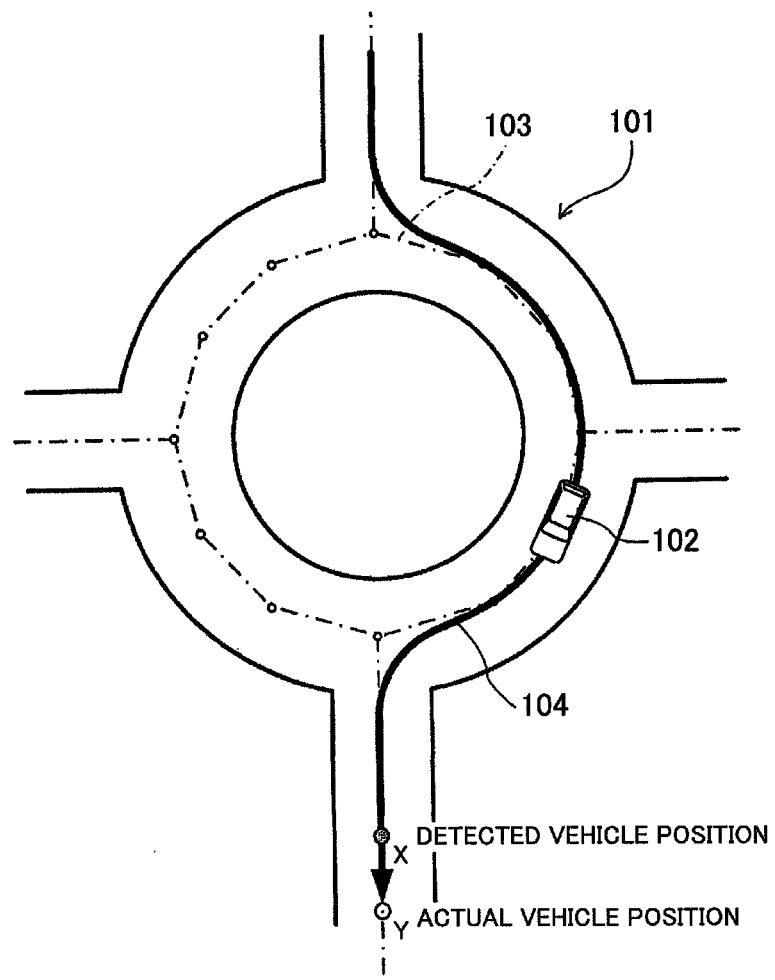
FIG. 7 is a diagram showing the problems with the related art.

The following describes in detail the processing of recalculating the difference direction angle in S11 with reference to 6. As shown in FIG. 6, the CPU 41 compares the vehicle direction θ1, acquired as the dead reckoning navigation information, and the connected vehicle movement direction θ3 that is the direction from the first connection position 63 toward the second connection position 64 and newly calculates the absolute value of the difference between the vehicle direction θ1 and the connected vehicle movement direction θ3, (|θ1−↓3|), as the difference direction angle. That is, the CPU 41 corrects the difference direction angle. The calculated difference direction angle is used for the cost calculation of the processing-target current position candidate as will be described later. Basically, in the cost calculation, the smaller the difference direction angle of a current position candidate is, the smaller the cost value is. That is, it is determined that the smaller the difference direction angle is, the closer the current position candidate is to the actual vehicle's position and, as a result, the current position candidate becomes the most likely candidate. Especially when the vehicle passes through a position where the link direction changes greatly such as the entrance or the exit of a rotary, the vehicle's traveling path sometimes differs greatly from the link shape. Therefore, when the direction from the before-update position toward the after-update position is used as the vehicle movement direction as in a general calculation method, the difference direction angle becomes large (that is, the cost value becomes large), sometimes leading to an incorrect determination that the current position candidate, though actually near to the actual vehicle position, is not the most likely candidate. To solve this problem, the CPU 41 performs the processing in S9 to S11 in this embodiment as follows. The CPU 41 identifies the first correction position obtained by moving the before-update position in the backward direction and the second correction position obtained by moving the after-update position in the forward direction and then sets the direction from the first correction position toward the second correction position to the vehicle movement direction. Determining the vehicle movement direction in this way prevents the difference direction angle of a current position candidate, which is actually near to the actual vehicle position, from being increased (prevents the cost from being increased), allowing the current position candidate to be easily selected as the most likely candidate.

After that, in S12, the CPU 41 performs the cost calculation for the processing-target current position candidate based on the difference direction angle calculated in S11 (or in S7 or S15 if the processing in S11 is not performed). In this embodiment, the cost value is an index for determining whether a processing-target current position candidate is suitable as the vehicle's current position, and the cost calculation is the calculation of the cost value for a processing-target current position candidate. It is determined that the smaller the cost value of a current position candidate calculated by the cost calculation is, the more suitable the current position candidate is as the vehicle's current position (that is, the current position candidate is close to the actual vehicle position). Basically, the smaller the difference direction angle of a current position candidate is, the smaller the calculated cost value is. When there are multiple current position candidates, a current position candidate with the smallest cost value is estimated to be nearer to the actual vehicle's current position and is identified as the most likely candidate.

On the other hand, the same processing that is performed in S5 to S7 described above is performed in S13 to S15, and the direction from the before-update position toward the after-update position is calculated as the vehicle movement direction, according to a general calculation method. After that, the cost calculation is performed based on the calculated difference direction angle (S12).

The processing S2 to S15 is performed sequentially for all current position candidates acquired in S1 and, after the processing in S2 to S15 is performed for all current position candidates acquired in S1, the processing proceeds to S16.

In S16, the CPU 41 identifies the updated position (predicted position) of a current position candidate, which is one of the current position candidates acquired in S1 and whose cost value calculated for the updated current position candidate is the smallest, as the most likely candidate. After that, on the assumption that the vehicle is located at the position corresponding to the most likely candidate, other processing (vehicle's current position display control, junction guidance control, vehicle speed reduction control, and so on) that uses the vehicle's current position is executed. That is, the new most likely candidate is detected as the vehicle's current position and the vehicle's current position is updated from the previous most likely candidate to the new most likely current position candidate.

In the vehicle position detection processing program described above, the position of the vehicle relative to the base position is detected as the vehicle position using the dead reckoning navigation. The base position is updated to a vehicle position, detected not by the dead reckoning navigation based on the GPS 21 and high-accuracy location technology, with right timing (for example, when the ACC is turned on or each time a predetermined interval elapses).

As described above in detail, according to the navigation device 1 in this embodiment, the moving body position detection method using the navigation device 1, and the computer program executed in the navigation device 1, the current position candidate, which is a candidate for the vehicle's current position, is updated to a position at which the vehicle will arrive after a predetermined interval based on the dead reckoning navigation (S2). In addition, the direction from the position before the update (before-update position) toward the position after an update (after-update position) is acquired as the vehicle movement direction (S6). The difference direction angle that is the difference between the current vehicle direction, acquired based on the dead reckoning navigation information, and the vehicle movement direction (S7) are calculated and, if the difference direction angle is equal to or larger than a threshold, the difference direction angle is corrected (S9-S11). Then, the detection position of the vehicle is updated based on the corrected difference direction angle (S16). Therefore, when the position of a vehicle is detected based on the dead reckoning navigation, the position of the vehicle can be detected more accurately. In particular, when a vehicle moves on a curved road or on a road with a shape where the link direction changes greatly such as a rotary, it is possible to reduce a difference between the actual vehicle position and the detection position even if the shape of a traveling path, along which the vehicle moves, does not match the shape of a link included in the map information.

The first correction position obtained by moving the before-update position in the backward direction of vehicle's traveling direction and the second correction position obtained by moving the after-update position in the forward direction of vehicle's traveling direction are identified and, then, the direction from the first correction position toward the second correction position is set to the vehicle movement direction to correct the difference direction angle. Therefore, the vehicle position, which serves as the base point when calculating the displacement direction of the vehicle, is moved in the forward direction or the backward direction, with the result that the displacement direction of the vehicle can be calculated such that it does not differ greatly from the direction of the actual vehicle. This prevents the vehicle position from being detected at a position greatly different from the actual vehicle position.

When there are multiple current position candidates (predicted positions) each of which is an update candidate for the vehicle's current position, the cost is calculated based on the difference direction angle of each current position candidate. Then, the detection position of the vehicle is updated to the updated position of the current position candidate with the smallest cost. This cost calculation allows the cost to be calculated accurately even when a vehicle moves on a curved road or on a road with a shape where the link direction changes greatly such as a rotary. As a result, the difference between the actual position of the vehicle and the detection position can be reduced.

The cost is calculated such that the smaller the difference direction angle of a current position candidate is, the lower the cost is. This means that the detection position of the vehicle can be updated to the updated position of a current position candidate that is one of the multiple current position candidates and is estimated to be nearest to the actual position of the vehicle based on the vehicle direction.

When a vehicle is moving in a rotary, when a vehicle is going to enter a rotary, or when a vehicle is going to exit a rotary, the vehicle position is updated by correcting the difference direction angle. Therefore, the position of a vehicle can be detected accurately especially when the vehicle moves in a rotary.

It is to be understood that the present invention is not limited to the embodiment described above and that various changes and modifications may be made without departing from the concept of the present invention. For example, though the direction from the first correction position, obtained by moving the before-update position in the backward direction, toward the second correction position, obtained by moving the after-update position in the forward direction, is set to the vehicle movement direction as described in S9 to S11 in this embodiment, only one of the before-update position and the after-update position may be moved. That is, the direction from the first correction position toward the after-update position may be set to the vehicle movement direction or, conversely, the direction from the before-update position toward the second correction position may be set to the vehicle movement direction.

Although the processing in S5 to S12 is executed in this embodiment when a vehicle is moving in a rotary, when a vehicle is going to enter a rotary, or when a vehicle is going to exit a rotary, the navigation device may also be configured to execute the processing under other conditions. For example, the navigation device may be configured to execute the processing in S5 to S12 when a vehicle travels on a curved road with a curvature equal to or larger than a predetermined value. In addition, the processing in S5 to S12, though executed only for the most likely candidate in this embodiment, may be executed for a current position candidate other than the most likely candidate.

In addition, though the navigation device is configured in this embodiment to execute the vehicle position detection processing program (FIGS. 2A and 2B) and update the detection position of the vehicle each time the vehicle travels a predetermined detection interval distance (for example, 6 m), the detection position of the vehicle may also be updated at other times. For example, the detection position of the vehicle may also be updated each time a predetermined time elapses. In that case, the distance over which the vehicle travels is detected with the use of the vehicle speed sensor 22 at a predetermined time interval, in which case the detected distance is the detected interval distance.

The present invention is applicable not only to a navigation device but also to various types of devices having the function to detect the current position of a moving body such as a vehicle. For example, the present invention is applicable to a portable terminal such as a mobile phone or a smartphone or to a personal computer, a portable music player, and so on (hereinafter these devices are called a portable terminal). The present invention is applicable also to a system composed of a server and portable terminals. In that case, the vehicle position detection processing program (FIG. 2) may be configured to allow each of the steps to be executed by one of the components, either the server or a portable terminal, of the system. The present invention, when applied to a portable terminal, may detect the position of a moving body other than a vehicle, for example, the position of the user of a portable terminal or the vehicle position of as a bicycle.

What is claimed is:

1. A moving body position detection system comprising:
   a dead reckoning navigation information acquisition unit that acquires dead reckoning navigation information including a direction of a moving body;
   a position identification unit that identifies a position of the moving body based on the dead reckoning navigation information on the moving body;
   a position prediction unit that predicts a predicted position at which the moving body is to arrive after an elapse of a predetermined interval from the position of the moving body, identified by the position identification unit, based on the dead reckoning navigation information on the moving body;
   a direction angle calculation unit that calculates a difference direction angle that is an angular difference between a direction from the position of the moving body, identified by the position identification unit, to the predicted position and the direction of the moving body;
   a direction angle correction unit that corrects the difference direction angle if the difference direction angle is equal to or larger than a threshold; and
   a position update unit that updates the position of the moving body, identified by the position identification unit, based on the difference direction angle.

2. The moving body position detection system according to claim 1, wherein:
   the direction angle correction unit includes a first correction position identification unit that identifies a first correction position obtained by moving the position of the moving body, identified by the position identification unit, in a backward direction of a traveling direction of the moving body, and a second correction position identification unit that identifies a second correction position obtained by moving the predicted position in a forward direction of the traveling direction of the moving body; and
   the direction angle correction unit sets the difference direction angle to a difference between a direction, from the first correction position to the second correction position, and the direction of the moving body.

3. The moving body position detection system according to claim 1, wherein:
the direction angle correction unit includes a first correction position identification unit that identifies a first correction position obtained by moving the position of the moving body, identified by the position identification unit, in a backward direction of a traveling direction of the moving body; and
the direction angle correction unit sets the difference direction angle to a difference between a direction, from the first correction position to the predicted position, and the direction of the moving body.

4. The moving body position detection system according to claim 1, wherein:
the direction angle correction unit includes a second correction position identification unit that identifies a second correction position obtained by moving the predicted position in a forward direction of the traveling direction of the moving body; and
the direction angle correction unit sets the difference direction angle to a difference between a direction, from the position of the moving body, identified by the position identification unit, to the second correction position, and the direction of the moving body.

5. The moving body position detection system according to claim 1, wherein:
the position prediction unit predicts a plurality of the predicted positions;
the position update unit comprises a cost calculation unit that calculates a cost for each of the plurality of the predicted positions based on the difference direction angle; and
the position update unit updates the position of the moving body to the predicted position which is one of the plurality of the predicted positions and whose cost is the lowest.

6. The moving body position detection system according to claim 5, wherein the cost calculation unit calculates the cost such that the smaller the difference direction angle of the predicted position is, the lower the cost is.

7. The moving body position detection system according to claim 1, wherein the direction angle correction unit corrects the difference direction angle when the moving body moves in a rotary, when the moving body enters a rotary, or when the moving body exits a rotary.

8. A moving body position detection apparatus comprising:
a dead reckoning navigation information acquisition unit that acquires dead reckoning navigation information including a direction of a moving body;
a position identification unit that identifies a position of the moving body based on the dead reckoning navigation information on the moving body;
a position prediction unit that predicts a predicted position at which the moving body is to arrive after an elapse of a predetermined interval from the position of the moving body, identified by the position identification unit, based on the dead reckoning navigation information on the moving body;
a direction angle calculation unit that calculates a difference direction angle that is an angular difference between a direction from the position of the moving body, identified by the position identification unit, to the predicted position and the direction of the moving body;
a direction angle correction unit that corrects the difference direction angle if the difference direction angle is equal to or larger than a threshold; and
a position update unit that updates the position of the moving body, identified by the position identification unit, based on the difference direction angle.

9. A moving body position detection method comprising:
acquiring dead reckoning navigation information including a direction of a moving body;
identifying a position of the moving body based on the dead reckoning navigation information on the moving body;
predicting a predicted position at which the moving body is to arrive after an elapse of a predetermined interval from the identified position of the moving body, based on the dead reckoning navigation information on the moving body;
calculating a difference direction angle that is a difference between a direction from the identified position of the moving body to the predicted position and the direction of the moving body;
correcting the difference direction angle if the difference direction angle is equal to or larger than a threshold; and
updating the identified position of the moving body based on the difference direction angle.

10. A non-transitory computer-readable storage medium that stores computer-executable instructions for performing a moving body position detection function comprising:
acquiring dead reckoning navigation information including a direction of a moving body;
identifying a position of the moving body based on the dead reckoning navigation information on the moving body;
predicting a predicted position at which the moving body is to arrive after an elapse of a predetermined interval from the identified position of the moving body, based on the dead reckoning navigation information on the moving body;
calculating a difference direction angle that is a difference between a direction from the identified position of the moving body to the predicted position and the direction of the moving body;
correcting the difference direction angle if the difference direction angle is equal to or larger than a threshold; and
updating the identified position of the moving body based on the difference direction angle.

* * * * *